UNITED STATES PATENT OFFICE.

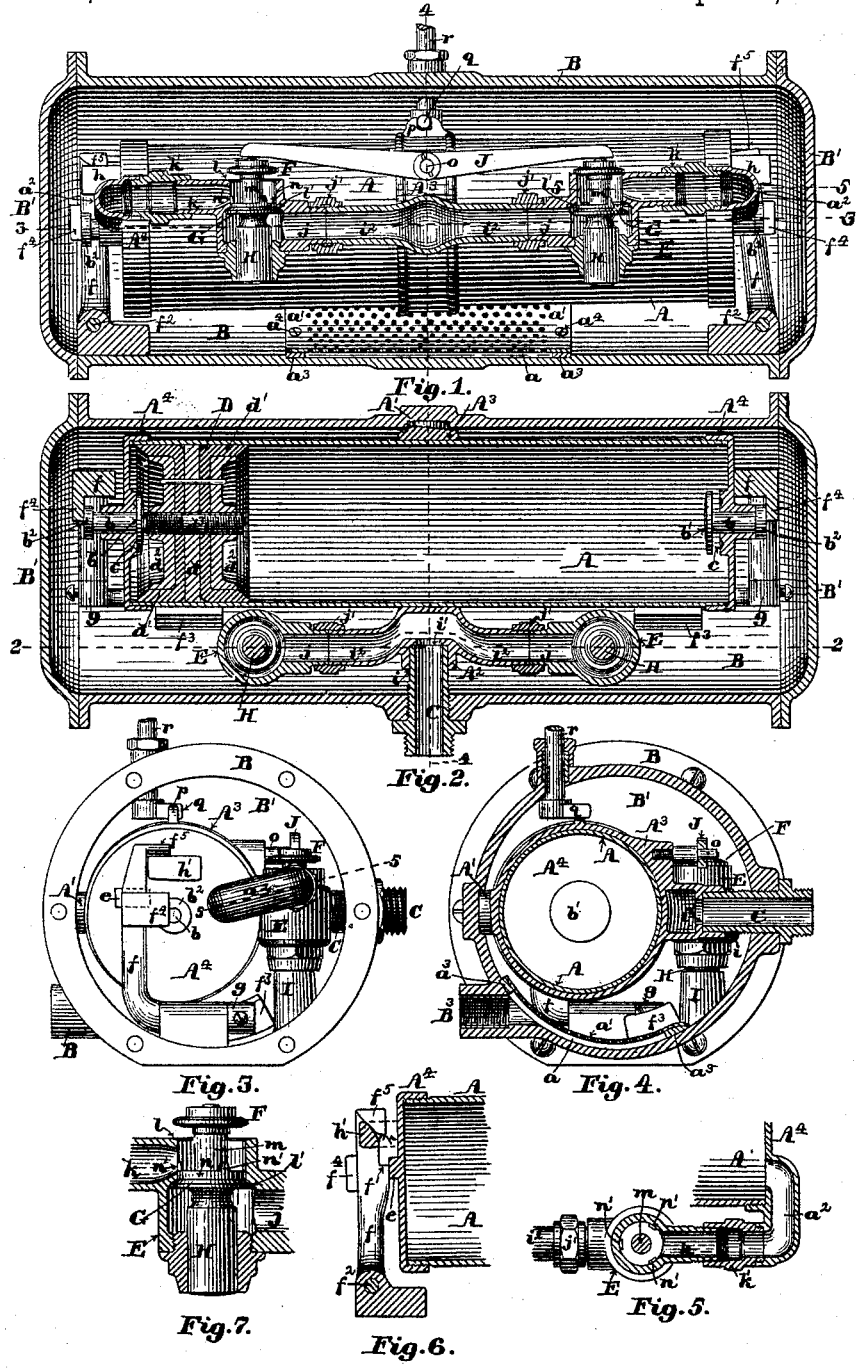

RICHARD J. ROGERS, OF CHELSEA, MASSACHUSETTS, ASSIGNOR TO THE ROGERS LIQUID METER COMPANY, OF PORTLAND, MAINE.

WATER-METER.

SPECIFICATION forming part of Letters Patent No. 458,739, dated September 1, 1891.

Application filed April 10, 1891. Serial No. 388,373. (No model.)

*To all whom it may concern:*

Be it known that I, RICHARD J. ROGERS, of Chelsea, in the county of Suffolk and State of Massachusetts, have invented certain new and useful Improvements in Water-Meters, of which the following, taken in connection with the accompanying drawings, is a specification.

This invention relates to water-meters and is an improvement upon the meter shown and described in the Letters Patent Nos. 373,608 and 431,622, granted to me November 22, 1887, and July 8, 1890, respectively; and it consists in certain novel features of construction, arrangement, and combination of parts, which will be readily understood by reference to the description of the accompanying drawings, and to the claims hereinafter given, and in which the invention is clearly pointed out.

Figure 1 of the drawings is a sectional elevation of a meter illustrating this invention, the cutting-plane being through the axial line of the outer casing and through the valve-casings and connecting-pipes on line 2 2 on Fig. 2. Fig. 2 is a longitudinal section on line 3 3 on Fig. 1. Fig. 3 is an end elevation with the head of the outer casing removed. Fig. 4 is a transverse section on line 4 4 on Figs. 1 and 2. Fig. 5 is a partial section on line 5 5 on Figs. 1 and 3. Fig. 6 is a vertical section of a portion of one end of the inner cylinder and locking devices, and Fig. 7 is a section through one of the valve-seats and showing the valve in elevation drawn to an enlarged scale.

In the drawings, A is a measuring-cylinder provided at the center of its length with the re-enforcing ring $A^3$, upon which are formed the trunnions $A'$ and $A^2$, the former fitting into a bearing in the outer casing or cylinder B, while the latter is provided with a socket to receive the inner end of the discharge-pipe C, which screws into a threaded bearing in the opposite side of said outer cylinder B, as shown in Figs. 2 and 4. The ends of the cylinder B are closed by the removable heads $B'$ $B'$, and said cylinder incloses all the working parts of the meter, except the register, and all the water to be measured enters said outer casing before entering the measuring-cylinder A.

The cylinder B is provided with the inlet-pipe $B^3$, which communicates at its inner end with the shallow chamber $a$, formed by the frame $a^3$ and the perforated plate or strainer $a'$, which serves to prevent foreign substances entering the cylinder to the injury of the working parts or the clogging of the meter, said frame and plate being secured in position in the cylinder B by the screws $a^4$ $a^4$, so as to be readily and easily removable for cleaning all parts, as shown in Figs. 1 and 4.

The ends of the measuring-cylinder A are closed by the heads $A^4$, each of which has cast in one piece therewith the bent pipe $a^2$ and has mounted in a bearing in its center, the movable plunger $b$, having the disk-like head $b'$ on its inner end and the collar $b^2$ on its outer end, as shown. The inner faces of the heads $A^4$ have formed therein annular grooves $c$ in position to be covered by the disk-like heads $b'$ to serve as water-packings to the joints around the plungers $b$.

The piston D is composed of the central disk $d$, the cupped leather packing-rings $d'$ $d'$, the follower-disks $d^2$, and the central binding-bolt $d^3$, the ends of which act alternately upon the plungers $b$ to move them outward, as shown at the left of Fig. 2.

Each of the heads $A^4$ of the measuring-cylinder has formed upon or secured to its outer face a lug or shoulder $e$, with which the shoulder $f'$ on the lever $f$ engages to lock the cylinder A at the end which is in its most elevated position. The levers $f$ are mounted on or formed in one piece with rocker-shafts $f^2$, fitted to bearings in the stands, secured in fixed positions one in each end of the outer cylinder B, and having secured to their opposite ends the arms $g$, each of which carries at its movable end the counter-weight $f^3$, which serves to move the upper end of the lever $f$ inward to cause the shoulder $f'$ to engage with the lug $e$ when the end of the cylinder is in its most elevated position. The levers $f$ each have formed thereon a laterally-projecting ear $f^4$, with which the outer end of the plunger $b$ engages to move said lever outward and disengage the shoulders $e$ and $f'$ when said plunger is moved outward by the piston D. Each of the levers $f$ extend above the shoulder $f'$ and is provided at its upper end with the laterally-projecting lug $f^5$, the outer side of which is inclined to an angle of about forty-five degrees and is arranged to engage with a similarly-inclined surface on the inner face of the lug $h'$, projecting laterally from the stand $h$, secured to the outer face of the head $A^4$, when said lever is moved outward by the piston D striking the plunger $b$ and moving it outward, whereby the pressure of the liquid in the cylinder A behind the piston D is made available to assist in tilting said cylinder as the piston approaches the end of its stroke.

The socket $i$ in the trunnion $A^2$ of the measuring-cylinder is provided with the shoulder $i'$, against which the inner end of the discharge-pipe C abuts, and said trunnion has projecting therefrom upon opposite sides the pipes $i^2 i^2$, which communicate with the interior of said socket $i$, as shown in Fig. 2.

E E are two valve-casings, each connected at one side to a pipe $i^2$ by means of a short pipe $j$ and the coupling-nut $j'$ and on the other side to pipe $a^2$ by means of the short pipe $k$ and the coupling-nut $k'$, all as shown in Fig. 1. The casings E are each provided with two valve-seats $l$ and $l'$, the former above and the latter below the opening of the pipe $k$ into said casing, as shown.

F is an inlet-valve fitted to the seat $l$ and firmly secured to the upper end of the spindle $m$, formed in one piece with the discharge-valve G and the pendent piston or plunger H, said valve G being fitted to the seat $l'$ and provided upon its upper side with a short cylindrical section $n$ to enter the inner periphery of said seat $l'$ when said discharge-valve is closed to prevent leakage past said valve, which might otherwise be caused by a slight spring or yield of the parts, said cylindrical section being of less height than the vertical movement of said valve. Said valve G is also provided with a series of three or more upwardly-projecting ears $n' n'$, the outer surfaces of which are coincident with the outer periphery of said cylindrical section $n$ and of such a length that they cannot be withdrawn from the opening through the seat $l'$ when said valve is open and the inlet-valve is closed. This construction of the discharge-valve is considered a very important feature of this invention, as it has been found that with it the registration is not affected by wide variations in the pressure, while without the cylindrical section $n$ the registration is very seriously affected by a considerable increase of pressure, or, in other words, while it will register accurately under a low pressure, if a high pressure is used it will not register as much water as is due to the number of oscillations given to the measuring-cylinder; but when said cylindrical section $n$ is applied to the valve, as shown and described, there is no appreciable difference in the registration whether a high or low pressure is used.

The discharge-valves are closed by the lower ends of the pistons or pendent stems H coming in contact with the bosses I I, formed in or secured to the interior of the cylinder B directly beneath said valves, when the ends of the cylinder A are depressed.

A lever J is pivoted at $o$ and bears at each end upon one of the inlet-valves or the upper end of one of the stems to which said inlet-valve is secured, so that when one end of the cylinder A is depressed and the discharge-valve at that end is closed by coming in contact with said boss I the inlet-valve attached to the same spindle is opened, the end of the lever J resting thereon is raised, its opposite end is correspondingly depressed, the inlet-valve at the other end of the cylinder is closed, and the corresponding discharge-valve is opened, as shown in Figs. 1, 3, and 4.

The cylinder B is provided at the center of its length and upon its upper side with the slotted lug $p$, which engages the movable end of the short lever $q$, secured upon the lower end of the vertical rocker-shaft $r$, mounted in a packed bearing in the shell of the outer cylinder B, through the operation of which the registering mechanism, (not shown,) but which may be of any well-known construction, may be operated.

The operation of this invention is as follows: The meter being properly connected in the line of service-pipe and the outer casing and the cylinder A being filled with water, and the several parts being in the positions shown in the drawings, if the faucet be opened to draw water therefrom water from the main service-pipe enters the outer casing through the inlet-passage $B^3$ and the perforated plate $a'$, and water from the interior of the outer cylinder flows beneath the inlet-valve F through the pipes $k$ and $a^2$ to the interior of the cylinder A at the left of Figs. 1 and 2 and moves the piston D toward the right of said figures, and the water in said cylinder A at the right of said piston is forced through pipes $a^2$ and $k$ through the valve-seat $l$ at the right of Fig. 1 through the pipes $j$, $i^2$, and C to and through the faucet. (Not shown.) The piston D, when it has nearly completed its stroke toward the right of Figs. 1 and 2, comes in contact with the disk $b'$ of the plunger $b$ and forces said plunger outward, and said plunger, acting upon the lug or ear $f^4$, moves the free end of the lever $f$ at the right of Fig. 1 outward, thus disengaging the shoulders $f''$ and $e$ and causing the inclined side of lug $f^5$ on the lever $f$ to act upon the inclined side of the lug $h'$ on the stand $h$, which action, co-operating with the weight of the piston, insures the depression of that end of the cylinder A and the consequent elevation of its opposite end, in which position said cylinder is locked by the engagement of the shoulder $f''$ on the lever $f$ with the lug or shoulder $e$ at the left of Fig. 1. When the right-hand end of the cylinder A is depressed, as above described, the discharge and inlet valves at that end are moved upward, so as to close the former and open the latter, by the piston or stem H coming in contact with the boss I, and at the same time through the movement of the lever J the valves at the other end are moved downward, so as to close the inlet and open the discharge when the current of water is reversed, and the piston D is moved toward the left of Fig. 1 until it strikes the disk $b'$ and moves the plunger $b$ outward, thereby moving the free end of the lever $f$ at the left of Fig. 1 outward to unlock the cylinder and cause that end of it to be depressed and again reverse the valves, and consequently the direction of the flow of the water.

It will be seen that by the construction shown and described the pressure of water behind the piston, acting to move it to the end of the cylinder, is made available as an assistance to the force of gravity for oscillating the measuring-cylinder, and thereby effecting the necessary changes of the valves and the locking of the cylinder A, so as to hold it in its inclined position until the stroke of the piston D is nearly completed.

I claim—

1. In an oscillating water-meter, the combination of a fixed outer casing, an oscillating measuring-cylinder mounted by suitable trunnion-bearings within said outer casing, a reciprocating piston in said cylinder, a reciprocating plunger fitted to a bearing in each head of said cylinder, a locking lug or shoulder formed upon each head of said cylinder, a stand or lug formed upon or secured to each of said heads and having its inner and upper surface inclined, as set forth, and a pair of weighted levers fulcrumed in a stand formed in or secured to the interior of said outer casing, one at each end, in positions to be acted upon by said plungers to move them outward, each of said levers being provided with a shoulder to engage the locking lug or shoulder on the head of said cylinder and with a lug having an inclined outer and lower surface to engage the inclined surface of the lug or stand on the cylinder-head, whereby the pressure of the water behind the piston is made to aid in tilting the measuring-cylinder when the piston is nearing the end of its stroke.

2. In an oscillating water-meter, the combination, with the oscillating measuring-cylinder A and the pipes $a^2$, $i^2$, and C, of the two valve-casings E E, the inlet-valves F, and discharge-valves G, connected together by the stem $m$, said discharge-valve G having an inclined or conical seating-surface and provided with the cylindrical section $n$ to fit into and fill the opening through its seat, and also provided with a series of guiding-ears, the outer surfaces of which are coincident with the periphery of said cylindrical section, substantially as described.

3. In an oscillating water-meter, the combination, with the oscillating measuring-cylinder A and the pipes $a^2$, $i^2$, and C, of the valve-casings E E, the two pairs of puppet-valves F and G, each pair connected together by the stem $m$ and provided with the pendent piston H, the lever J, fulcrumed at its center and resting at each end upon one of the valves or valve-stems, and the fixed inclosing casing B, provided in its interior with the bosses I I, all constructed, arranged, and adapted to operate substantially as and for the purposes described.

4. In a water-meter, the combination of a fixed outer casing or cylinder provided with an inlet-pipe, an oscillating measuring-cylinder mounted by suitable trunnions in bearings within said outer casing, a piston movable endwise in said measuring-cylinder, a device to be acted upon by said piston to transmit motion from said piston to the exterior of said measuring-cylinder, suitable pipes and valves for controlling the flow of water, locking devices for locking said cylinder at each extreme of its oscillations, and cam-surfaces to be operated by the movements of said piston and aid in oscillating said cylinder, substantially as described.

5. The combination of the outer casing B, provided with the inlet-pipe $B^3$ and the bosses I I, the measuring-cylinder A, provided with trunnions and mounted in bearings in said casing, the piston D, the plunger $b$ $b$, two pairs of valves F and G, each pair connected by a common stem and provided with the pendent piston H, the cylindrical hub $n$, forming part of each discharge-valve G, suitable inlet and discharge pipes, the lever J, the inclined-surfaced lugs $h'$, and the shoulders $e$ on the heads of the cylinder A, a pair of pivoted levers $f$, provided with the shoulders $f'$, and the inclined-faced lug $f^5$, and the counter-weight $f^3$, all constructed, arranged, and operating substantially as described.

In testimony whereof I have signed my name to this specification, in the presence of two subscribing witnesses, on this 6th day of April, A. D. 1891.

RICHARD J. ROGERS.

Witnesses:
 N. C. LOMBARD,
 WALTER E. LOMBARD.